July 28, 1925.
J. B. WHITMORE ET AL
1,547,705
MACHINERY FOR MAKING INCANDESCENT ELECTRIC LAMPS
Filed Sept. 8, 1921  2 Sheets-Sheet 1
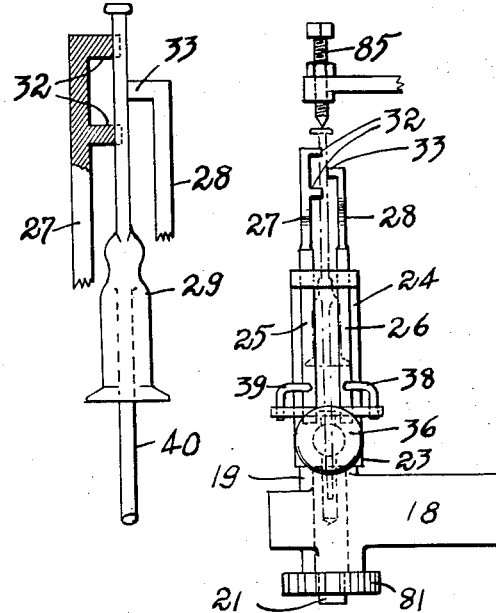
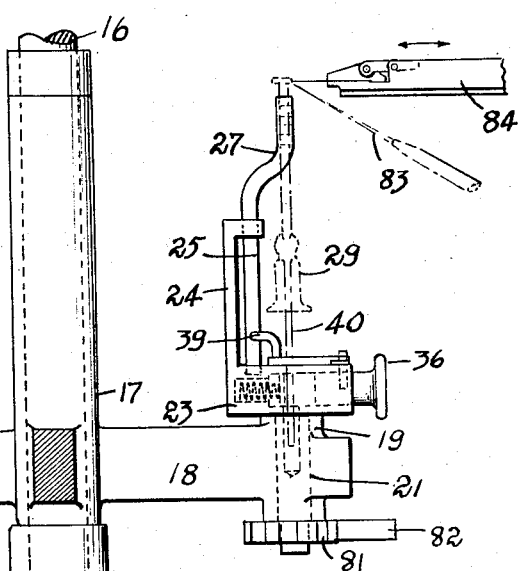
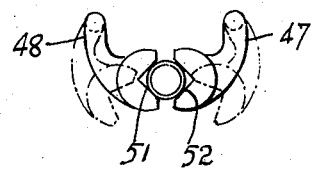
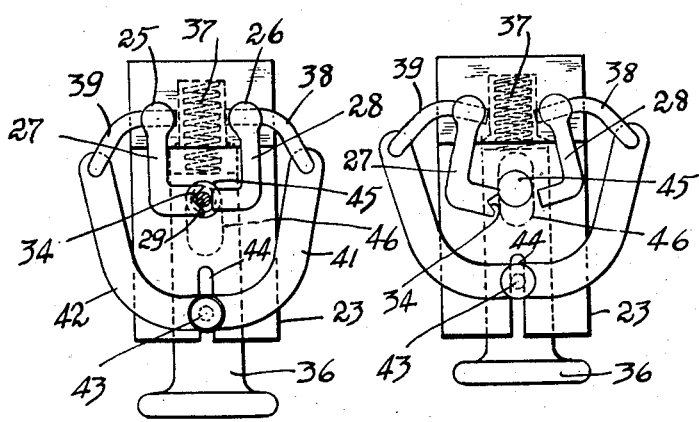
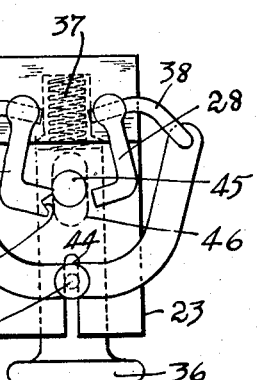
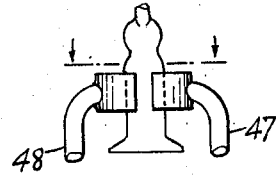
INVENTORS
JAMES B. WHITMORE.
JOHN E. FERGUSON.
BY
ATTORNEY

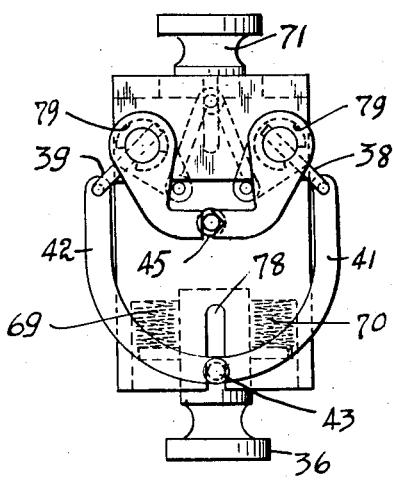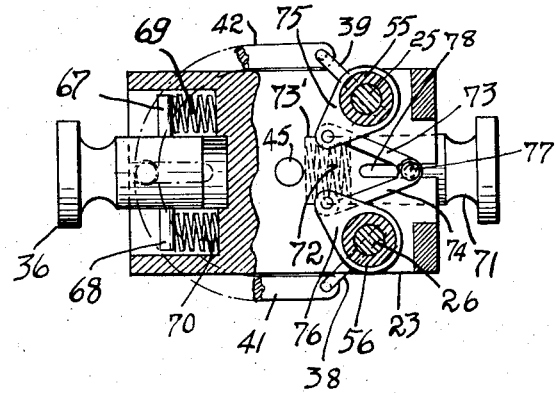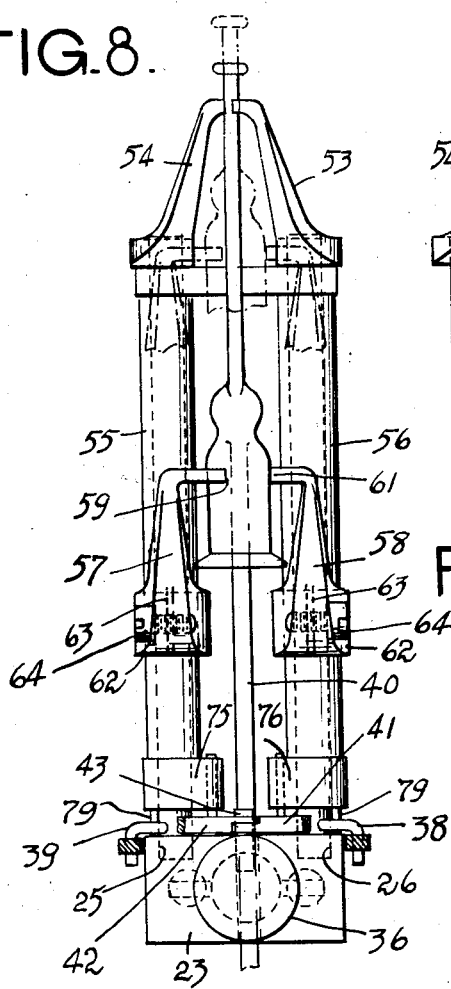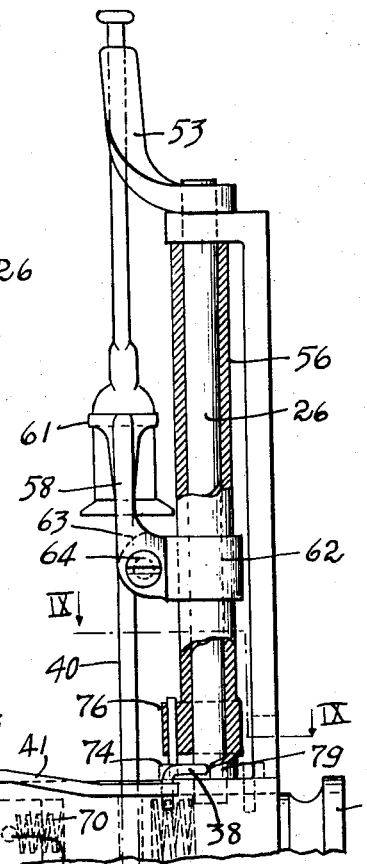

Patented July 28, 1925.

1,547,705

UNITED STATES PATENT OFFICE.

JAMES BRYANT WHITMORE AND JOHN EBLING FERGUSON, OF BLOOMFIELD, NEW JERSEY, ASSIGNORS TO WESTINGHOUSE LAMP COMPANY, A CORPORATION OF PENNSYLVANIA.

MACHINERY FOR MAKING INCANDESCENT ELECTRIC LAMPS.

Application filed September 8, 1921. Serial No. 499,324.

*To all whom it may concern:*

Be it known that we, JAMES BRYANT WHITMORE, a citizen of the United States, and a resident of Bloomfield, in the county of Essex and State of New Jersey, and JOHN EBLING FERGUSON, a citizen of the United States, and a resident of Bloomfield, in the county of Essex and State of New Jersey, have invented a new and useful Improvement in Machinery for Making Incandescent Electric Lamps, of which the following is a specification.

This invention relates to improvements in devices for supporting fragile objects and it relates more particularly to holders for supporting the stems during the insertion of the support wires in the manufacture of incandescent electric lamps.

An object of the invention is to provide a simple and efficient device which may be actuated to receive a stem and support it in a given position.

A further object is to provide a device including mechanism for controlling the opening and closing of gripping members in such a manner that an operator may speedily and conveniently actuate the movable parts of the device to facilitate the accurate adjustment of a stem therein.

Although the present invention may be used to advantage in connection with various types of lamp-making machinery requiring a holder for supporting work parts, it has been found especially advantageous when used to hold a stem in a support-wire-inserting machine.

A support-wire-inserting machine embodies a holder for supporting a stem with the button portion in position for the insertion of wires, and a holder for this purpose demands a co-ordination of elements by means of which an operator may quickly insert and remove a stem. The inserted stem must be held with its axial line in a given vertical position, and the holder be adapted to be rotated in a series of intermittent movements, each movement effecting a circumferential travel of the button a given number of degrees. During the interval between successive movements, a portion of the button is rendered plastic and the end of a wire is inserted radially. After a given number of wires have been properly positioned about the button of the stem, the operator removes it.

It is evident that, in a machine of this character, speed is an important factor, inasmuch as any lost motion on the part of an operator in applying or removing a stem from a holder subtracts from the production of the machine during a given period. It is also important that the mechanism of the holder be of such construction that an operator may expeditiously, and with the least amount of fatigue, be able to continually perform the operation of inserting and removing stems with a view to promoting production in an efficient and economical manner.

The present invention embodies the above desirable advantages which will manifest themselves upon reference to the following description and the accompanying drawings in which—

Fig. 1 is an elevation, partly in section, of the improved stem holder applied to a carrier or spider of a support-wire-inserting machine;

Fig. 2 is a detail of the jaws of the stem holder, partly in section;

Fig. 3 is an enlarged plan view of the stem holder with the jaws in a closed position;

Fig. 4 is a view similar to Fig. 3 but showing the jaws in their open position.

Fig. 5 is a plan view of a modification of the jaws by means of which the stems may be gripped about the flare-tube portion thereof;

Fig. 6 is a side elevation of the jaws shown in Fig. 5;

Fig. 7 is a plan view showing a modification of the stem holder;

Fig. 8 is a front elevation of Fig. 7, partly in section;

Fig. 9 is a side elevation of Fig. 7, partly in section;

Fig. 10 is a view partly taken on line IX—IX in Fig. 9, and partly broken away to show certain movable parts; and Fig. 11 is a detail of the jaws shown in Fig. 8, modified to provide a three-point contact with the stem.

This improved stem holder consists of a supporting frame or guide in which are mounted a pair of spindles or shafts. Each spindle has a jaw secured to its upper end and is provided, at its lower end, with a projecting lever which is connected to a reciprocable member or plunger. This member is normally resiliently held in a given position. An inward movement of the plunger actuates the jaws to open them for the insertion of a stem, and a release of the plunger permits the jaws to grip the stem and secure it within the holder.

Referring now to the drawing and more particularly to Fig. 1, the improved stem holder, as illustrated, is applied to a well-known form of support-wire-inserting machine. Only such parts of the inserting machine are shown, however, as will be relevant to a full understanding of the invention.

A support-wire-inserting machine essentially includes a base 15 in which is journaled a central vertical shaft 16. Secured to the shaft 16 and rotatable therewith, is a spider or holder carrier 17 provided with arms 18 which terminate in hubs 19. Each hub is adapted to rotatably support a shaft 21 to the upper end of which is rigidly secured a frame which constitutes the body portion of the stem holder illustrated as an embodiment of the present invention. This frame includes a base or bearing block 23 having an upright or bracket 24 integral therewith which terminates in a right-angle projection constituting a guide for a pair of vertical spindles or shafts 25 and 26.

The lower ends of the shafts 25 and 26 have their bearings in suitably dimensioned apertures provided in the block 23 and may be rotated individually about their respective axes. The upper portions of the shafts are off-set to provide arms 27 and 28 of such proportion and arrangement that, when oscillated toward each other, the inner faces move to a common point and may be adapted to serve as a gripping means to secure a stem 29 when positioned in their path. The stem may be gripped either upon its arbor portion of relatively small diameter or upon the enlarged or flare-tube portion.

For the purpose of more accurately positioning a stem, the arms 27 and 28 are provided with gripping members, as shown in Fig. 2, and it will be seen that the arm 27 is equipped with double jaws or projections 32, spaced apart, the one above the other. The arm 28 is provided with a single plain faced jaw 33. The faces of the jaws 32 are provided with V shaped notches 34 (see Fig. 3) for the purpose of centering the stem with respect to the jaws, this being readily accomplished by virtue of the cylindrical form of the stem.

The plain-face jaw 33 is carried at the upper end of the arm 28 and is located in a plane transverse to the holder and midway between the jaws 32; thus, when an arbor is gripped by the centering jaws, the plain-face jaw 33 acts to maintain the arbor in its central position and the stem is thus rigidly secured and prevented from any lateral or vertical movement. The arms 27 and 28 are so positioned and proportioned that they may be oscillated to bring the jaws together and secure a stem with its vertical axis coincident with a predetermined vertical line.

The arms 27 and 28 are actuated by a mechanism comprising a push rod or reciprocable member 36 which is normally maintained in an outer position, that is, the rod is normally in position to be pushed inwardly or toward the holder. This outer position of the holder is maintained by means of a helical spring 37 disposed between one end of a recess provided in the block 23 and the inner end of the push rod 36.

The gripping jaws are retained normally closed by means of their association with the push rod 36 to which they are connected. This connecting means consists of levers 38 and 39 secured to the shafts 25 and 26 adjacent the lower ends thereof, the levers being pivotally connected to the push rod 36 by links 41 and 42. The connection between the links and the rod 36 consists of a pin 43 extending through the ends of the two links. A slot 44 is provided in the block 23 to permit free movement of the pin 43 as the plunger is reciprocated. An inward movement of the push rod 36, through the links 41 and 42, effects a thrust upon the levers 38 and 39 to cause a partial rotation of the shafts 25 and 26 with a consequent opening of the jaws 32 and 33. The release of the push rod permits it to return, under the action of the spring 37, to a normal position and the jaws to close about a stem or other object positioned therebetween while the jaws were open.

This improved holder is adapted to support lamp stems of various types. The stem shown in dotted lines in several of the figures, is employed in the manufacture of so-called tipless lamps. This stem includes an exhaust tube 40 used for evacuating purposes during a subsequent step in the manufacture of the lamp. When a stem of this character is in position, the tube 40 may be positioned in a suitably located aperture 45 in the block 23 which leads to an elongated opening 46 disposed in the push rod 36.

The elongated opening or slotted passage in the push rod permits its free movement when a stem is occupying the holder. It is often desirable to secure a stem by gripping its larger or flare-tube portion, and the present holder may be conveniently adjusted to perform this function by a removal of the shafts 25 and 26 and a substitution of others having arms 47 and 48 and gripping jaws 51 and 52, as shown in Figs. 5 and 6.

It is an advantage to provide a stem holder which will be readily adjustable for the purpose of supporting stems of various types, some of which must, for practical reasons, be secured both at the enlarged portion thereof and at the relatively smaller portion. Figs. 7 to 11 inclusive illustrate a modification of the present invention in which a stem is quickly and conveniently supported by jaws which grip portions thereof having different diameters. One advantage of such a device resides in its adaptability to secure stems, the arbors and flares of which may not be of a uniform construction; namely the arbor when attached to a flare is sometimes slightly out of alignment with the axial line of the flare. A stem possessing the irregularity as above described, may readily be adjusted in this form of holder in which a lower pair of jaws may be actuated to grip the lower or flare portion of the stem and an upper pair of jaws may be independently actuated to secure the upper portion or arbor of the stem. By this means the button portion is supported in a plane suitable for the insertion of the support wires, and the holder may be rotated and the button maintained in a given plane. In this construction, the holder arms 53 and 54 are secured to the upper ends of the shafts 25 and 26, and outer hollow shafts or sleeves 55 and 56 are disposed to rotate about the shafts 25 and 26 and are adapted to carry a pair of independently operable arms 57 and 58 which are provided with a V shape jaw 59 and a plain-face jaw 61, respectively. The arms 57 and 58 are each provided with a hub 62. These hubs are cut, at 63, radially from the inner to the outer side, and the kerf thus produced, gives an allowance for the purpose of clamping the arms, by means of screws 64, to the sleeves 55 and 56. A slight loosening of the screws provides for the adjustment of the arms, which for example may, as shown in dotted lines in Fig. 8, be moved upwardly to grip the enlarged portion of a stem of the type in which the arbor portion is of relatively short length.

The upper arms 53 and 54 are actuated in a manner similar to that shown in the drawing and already described. In this instance, however, the plunger or push rod 36 is provided with two oppositely disposed pins 67 and 68 positioned to be engaged by springs 69 and 70 movable in recesses at each side of the rod. The connections between the shafts and the push rod are also the same as above described and illustrated in the preceding figures.

The arms 57 and 58 are actuated by an inward movement of a rear push-rod 71 which is normally maintained in an outer position by a spring 72 (see Fig. 10) which expands between an end of the rear push rod 71 and an end of a suitable recess 73' disposed in the block 23. This rear push rod 71 is similar to the rod 36 and is connected to the sleeves 55 and 56. A movement of the rod 71 thereby acts to oscillate the sleeves about the shafts 25 and 26 and consequently effect the opening and closing of the jaws 59 and 61 carried on arms 57 and 58. The connection between the rear push rod and the sleeves comprises a pair of links 73 and 74, an end of each being pivotally connected to lever arms 75 and 76 integral with and adjacent to the lower ends of the sleeves 55 and 56. The opposite ends of the links are connected to the push rod 71 by a pin 77 and a slot 78 is disposed in the block 23 to provide for the free movement of the pin as it travels with the push rod.

It will thus be evident that by thrusting the rear push rod 71 inwardly the jaws 59 and 61 are actuated, and that an inward thrust of the push rod 36 actuates the jaws 32 and 33.

When desirable, however, both pairs of jaws may be operated by the inward movement of the push rod 36 alone, this being accomplished by the formation of the lower ends of the sleeves 55 and 56 which may be either circumferentially slotted to permit the levers 38 and 39 to extend therethrough or have a vertical portion removed, as shown. This permits the uninterrupted movement of the levers 38 and 39 during the outward movement of the push rod 36. However, as the push rod moves inwardly, the levers 38 and 39 engage the lower segmental portions 79 of the sleeves and, as the push rod moves to the end of its stroke, it effects a partial rotation of the sleeves and causes an opening of the jaws 59 and 61. By this construction, the upper and lower jaws may be actuated either in sequential order by an actuation of the push rod 36 or simultaneously by an actuation of both push rods 36 and 71. The relative movements of the sleeves and shafts may be varied and be regulated by the initial positions of the levers 38 and 39 with relation to the lower ends 79 of the sleeves 55 and 56.

As shown in Fig. 11, the arms 53 and 54 may be provided with jaws 32 and 33 similar to those shown in Fig. 2 and, the desirable feature of this three-jaw construction may readily be embodied in combination with the lower jaws for embracing the enlarged portion of a stem.

When the present improved lamp-stem holder is employed in connection with a support-wire-inserting machine, as shown in Fig. 1, the lower end of the shaft 21 is provided with a ratchet wheel 81 positioned to be rotated in a series of intermittent movements by a pawl 82. By this means, the holder is rotatively moved a given number of degrees with each actuation of the pawl and, during the stationary interim, a flame 83 (as indicated in dotted lines) is brought to play upon the button portion of the stem to render it plastic for the insertion of a wire by an inserting member or ram 84.

In practice, the operator presses the push rod 36 to open the jaws, then inserts a stem, bringing the upper end thereof in contact with a stop pin 85. The stop pin is mounted in any suitable form of support and may be adjusted to vary the elevation of the plane in which the button is to be located for proper insertion of the support wires.

Having properly positioned the stem, the operator releases the push rod to permit the jaws to close and grip the stem. The spider is then rotated to bring the stem in position for intermittent rotative movement and the insertion of support wires and, when the holder again reaches its initial position, the push rod is again moved to open the jaws and release the stem which is replaced by a blank stem.

The simplicity of the present holder and the ease with which it may be actuated makes it a desirable attachment in the manufacture of lamp parts where accuracy in workmanship and volume of production are leading factors.

While a preferred embodiment of the invention has been illustrated, it is obvious that many structural changes may be effected therein, and it is, therefore, to be understood that the invention is to be limited only by the scope of the appended claims.

What is claimed is:

1. A device for holding an incandescent electric lamp stem comprising a pair of jaws, a support therefor and reciprocatory means for moving said jaws to hold a stem in a given vertical position.

2. A device for holding an incandescent electric lamp stem comprising a pair of movable jaws, a reciprocatory member and means associated with said member and jaws whereby a movement of said member effects a movement of said jaws.

3. A device for holding an incandescent electric lamp stem comprising a pair of jaws, oscillatory arms for carrying said jaws, a reciprocatory member and means associated with said member whereby a movement thereof causes an oscillation of said arms and jaws.

4. A device for holding an incandescent electric lamp stem comprising a pair of jaws adapted to be moved toward a common point and a reciprocatory member associated with said jaws and adapted, when moved, to cause an opening and closing of said jaws.

5. A device for holding an incandescent electric lamp stem comprising a pair of movable jaws, means for maintaining said jaws in a normally closed position and a reciprocatory member so associated with said jaws that a movement of said member effects an opening of said jaws.

6. A device for holding an incandescent electric lamp stem comprising a pair of movable jaws and a reciprocatory member associated with said jaws, whereby a movement of said member causes an opening of said jaws, and means for automatically closing said jaws.

7. A device for holding an incandescent electric lamp stem comprising a pair of movable jaws, a reciprocatory member and a guide therefor, means for maintaining said member in an outer position and connecting means common to said member and said jaws, whereby said jaws are opened by an inward movement of said member.

8. A device for holding an incandescent electric lamp stem comprising a pair of movable jaws, means for normally maintaining said jaws in a closed position, a reciprocatory member associated with said jaws, said member being adapted, when moved in one direction, to cause an opening of said jaws and, when moved in an opposite direction, to cause said jaws to close.

9. A device for holding an incandescent electric lamp stem comprising a pair of vertical shafts, guides for supporting said shafts, a gripping jaw mounted on each of said shafts, a reciprocatory member and a link connection between said member and said shafts, whereby a movement of said member effects a movement of said shafts and jaws.

10. A device for holding an incandescent electric lamp stem comprising a pair of vertical shafts, supporting guides therefor, a gripping jaw disposed on each of said shafts, a reciprocatory member and a link connection between said member and said shafts, whereby a movement of said member causes an opening of said jaws, and means for automatically closing said jaws.

11. A device for holding an incandescent electric lamp stem comprising a pair of vertical shafts, a base block for supporting said shafts, a gripping jaw disposed on each shaft, a reciprocatory member movable in said base block and link connection between said member and said shafts, whereby a reciprocation of said member causes an opening and closing of said jaws.

12. A device for holding an incandescent electric lamp stem comprising a pair of vertical shafts, each of said shafts having an arm secured to its upper end, a gripping jaw secured to each of said arms, a movable plunger having linked connection with said shafts and means for moving said plunger to effect an oscillation of said shafts and cause an opening and closing of said jaws.

13. A device for holding an incandescent electric lamp stem comprising a pair of upper jaws and a pair of lower jaws and a slidable member for moving said jaws to support a stem with its axis coincident with a given vertical line.

14. A device for holding an incandescent electric lamp stem comprising a pair of upper jaws and a pair of lower jaws and slidable members for opening and closing said jaws simultaneously.

15. A device for holding an incandescent electric lamp stem comprising a pair of upper jaws and a pair of lower jaws and a slidable member for effecting the sequential actuation of the said pairs of jaws.

16. A device for holding an incandescent electric lamp stem comprising a pair of upper jaws and a pair of lower jaws, a reciprocatory member and means connecting said jaws and member, whereby a movement of said member operates to actuate the said pairs of jaws in sequential order.

17. A device for holding an incandescent electric lamp stem comprising a pair of upper jaws and a pair of lower jaws, reciprocatory members and means connecting said jaws and members, whereby said pairs of jaws may be opened simultaneously by a movement of the said members.

18. A device for holding an incandescent electric lamp stem comprising a pair of upper jaws and a pair of lower jaws, reciprocatory members, means connecting said members and said pairs of jaws, whereby said jaws may be opened simultaneously by a movement of the said members, and means for automatically closing said jaws.

19. A device for holding an incandescent electric lamp stem comprising a pair of upper jaws and a pair of lower jaws, reciprocatory members and means connecting each of said pairs of jaws with said members whereby said jaws may be opened and closed independently by an actuation of said members.

20. A device for holding an incandescent electric lamp stem comprising an upper and a lower pair of movable jaws, means for maintaining said jaws in a normally closed position and a reciprocatory member so associated with said jaws that a movement of said member effects an opening of said jaws.

21. A device for holding an incandescent electric lamp stem comprising a pair of upper and lower jaws, means for maintaining said jaws normally closed, a reciprocatory member associated with said jaws, whereby said pairs of jaws may be opened by a movement of said member, and means for closing said jaws and returning said member to its initial position.

22. A device for holding an incandescent electric lamp stem comprising upper and lower pairs of oscillatory arms, a gripping jaw disposed upon each of said arms and slidable members associated with said arms whereby an independent opening and closing of each pair of jaws may be effected.

23. A device for holding an incandescent electric lamp stem comprising upper and lower oscillatory arms, a gripping jaw disposed upon each of said arms and a reciprocable member associated with said jaws, whereby a movement of said member effects the opening and closing of the said jaws.

24. A device for holding an incandescent electric lamp stem comprising upper and lower oscillatory arms, a gripping jaw disposed upon each of said arms a reciprocable member so associated with one pair of arms and another reciprocable member so associated with the other pair of arms that a reciprocation of one of said members acts to cause an opening and closing of one pair of jaws independent of the remaining pair.

25. A device for holding an incandescent electric lamp stem comprising upper and lower pairs of movable jaws, means for maintaining said jaws in a normally closed position, a pair of reciprocable members and means connecting said pairs of jaws to said members, whereby a movement of one of said members actuates one pair of said jaws.

26. A holder for supporting an incandescent electric lamp stem comprising a pair of lower jaws and a pair of upper jaws, and a member reciprocable in a path intersecting the longitudinal axis of the holder for actuating said jaws.

27. A holder for supporting an incandescent electric lamp stem comprising a plurality of jaws and means reciprocable in a path intersecting the longitudinal axis of the holder for actuating said jaws.

28. A holder for supporting an incandescent electric lamp stem comprising a pair of upper and lower jaws and means reciprocable to and from the longitudinal axis of the holder for actuating said jaws.

29. A holder for supporting an incandescent electric lamp stem comprising a pair of upper and lower jaws and a plurality of members reciprocable substantialy transversely to the longitudinal axis of the holder for actuating said jaws.

30. A holder for supporting an incandescent electric lamp stem comprising a plurality of oscillatory members to secure a lamp stem and means reciprocable substantially transverse to the longitudinal axis of said holder to actuate said members.

31. A device for holding an incandescent electric lamp stem comprising a pair of upper jaws and a pair of lower jaws, a reciprocable member, means connecting said member and said jaws, whereby a reciprocation of said member causes an opening and closing of said jaws, and means for varying the vertical distance between said pairs of jaws.

32. A device for holding an incandescent electric lamp stem comprising a pair of upper jaws and a pair of lower jaws, a reciprocable member having a link connection to said upper jaws and another reciprocable member having a link connection to said lower jaws, whereby a reciprocation of said members causes an opening and closing of said jaws, and means for varying the vertical distance between said pairs of jaws.

33. A device for holding an incandescent electric lamp stem comprising a pair of vertical shafts having arms at their upper ends provided with jaws, sleeves rotatable about said shafts, an arm having a jaw and mounted on each of said sleeves, means for varying the positions of said arms on said sleeves, and a slidable member for oscillating the said arms to open and close said jaws.

34. A device for holding an incandescent electric lamp stem comprising a pair of vertical shafts having arms at their upper ends provided with jaws, sleeves rotatable about the said shafts, an arm having a jaw and mounted on each of said sleeves, means for varying the vertical distance between the arms upon said shaft and that between the arms upon said sleeves, and means reciprocable in a path transverse to the longitudinal axis of said device for opening and closing said pairs of jaws.

35. A device for holding an incandescent electric lamp stem comprising a pair of shafts off-set at their upper ends and provided with jaws, a guide for said shafts, a plunger movable in a casing, a spring positioned to maintain said plunger in an outer position with respect to said casing, levers secured to said shafts, and link connections between said shafts and said plunger, whereby a movement thereof in one direction causes an oscillation of said shafts and effects a closure of said jaws and an opposite movement of said member operating to open said jaws.

In testimony whereof, we have hereunto subscribed our names this 7th day of Sept., 1921.

JAMES BRYANT WHITMORE.
JOHN EBLING FERGUSON.